(12) United States Patent
Eisenberg

(10) Patent No.: US 9,766,850 B2
(45) Date of Patent: Sep. 19, 2017

(54) MULTIPLE SCREEN ARRANGEMENT FOR MOBILE DEVICE

(71) Applicant: David Eisenberg, Los Angeles, CA (US)

(72) Inventor: David Eisenberg, Los Angeles, CA (US)

(*) Notice: Subject to any disclaimer, the term of this patent is extended or adjusted under 35 U.S.C. 154(b) by 14 days.

(21) Appl. No.: 14/616,737

(22) Filed: Feb. 8, 2015

(65) Prior Publication Data

US 2015/0268916 A1   Sep. 24, 2015

Related U.S. Application Data

(60) Provisional application No. 61/969,811, filed on Mar. 24, 2014.

(51) Int. Cl.
*G06F 3/14* (2006.01)
*H04M 1/725* (2006.01)
*H04M 1/02* (2006.01)

(52) U.S. Cl.
CPC ........ *G06F 3/1431* (2013.01); *H04M 1/7253* (2013.01); *H04M 1/72527* (2013.01); *H04M 1/0208* (2013.01); *H04M 1/0247* (2013.01); *H04M 1/0266* (2013.01); *H04M 2250/16* (2013.01)

(58) Field of Classification Search
CPC .................................................. H04M 2250/16
USPC .......................................................... 455/566
See application file for complete search history.

(56) References Cited

U.S. PATENT DOCUMENTS

2006/0082518 A1*   4/2006   Ram ..................... G06F 1/1601
                                                              345/1.1

\* cited by examiner

*Primary Examiner* — Omoniyi Obayanju
(74) *Attorney, Agent, or Firm* — Raymond Y. Chan; David and Raymond Patent Firm

(57) ABSTRACT

A multiple screen arrangement for a mobile device that includes a screen module and a communication module for communicatively linking the screen module with the mobile device. The screen module includes first and second screens movably coupled with each other between a first state and a second state, wherein at the first state, the second screen is overlapped behind the first screen in a single screen size manner, and at the second state, the first and second screens are moved side-by-side to provide two viewing windows. The communication module is adapted for receiving data from the mobile device to be displayed on at least one of the first and second screens, such that the first and second screens are adapted for selectively displaying the data from the mobile device between the first state and said second state.

15 Claims, 14 Drawing Sheets

MULTIPLE SCREEN ARRANGEMENT FOR MOBILE DEVICE

CROSS REFERENCE OF RELATED APPLICATION

This is a non-provisional application that claims priority to U.S. provisional application, application No. 61/969,811, filed Mar. 24, 2014.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a method for providing a multiple screen arrangement, and more particularly to a method for assembling a screen arrangement comprising at least one first screen and at least one second screen that can be selected to be overlapped and/or aligned with the first screen in an overlapping state, or moved apart, away from the overlapping state to enlarge the viewing screen area or to provide another viewing window.

Description of Related Arts

Normally, a device with a display unit such as a screen and a monitor can be arranged to provide a viewing window for a user. Such device can be a TV set, a computer such as a desktop computer, a portable computer, and a tablet computer, a phone, a multimedia player such a MP4, etc. However, currently, these devices are usually provided with only a single display screen. Such device with a single display screen has several disadvantages.

Firstly, when a user prefers a larger viewing screen, the only choice is to purchase another monitor with larger screen or use two or more monitors with a specific monitor software such as "UltraMon" and installation of a multiple monitor graphic card. However, it is inconvenient for the storage and transportation of the large sized display screens, and the cost is also high. Secondly, when a user runs two or more programs or applications on a single screen, he/she will feel inconvenient to change the different viewing windows between different programs or applications. When different programs or applications are run on separate computers, the user has to move from one computer to another to view the different screens. In addition, a display screen is usually easy to damage when falling on the ground or if it experiences a violent impact. However, it is not convenient to replace a new screen.

The above disadvantages and inconvenience become more obvious when we are using the mobile device like smart phone and tablets, such as iPhone, iPad, Galaxy Note, Galaxy Tab, and etc. Due to the powerful computing ability and portable capability of the smart phones and tablets, they almost substitute the computers and notebooks and become the most portable and convenience computing and communicating tools nowadays. However, how to provide larger viewing screen for such smart phone or tablet becomes a substantial need to all the users of the mobile devices.

SUMMARY OF THE PRESENT INVENTION

An object of the present invention is to provide a multiple screen arrangement comprising two or more screens that can be arranged for enlarging the viewing screen area or providing an additional viewing window for a user of a computing and/or communicating device.

Another object of the present invention is to provide a multiple screen arrangement for a digital device, such digital device can be a TV set, a computer such as a desktop computer, a portable computer, and a tablet computer, a phone, a multimedia player such a MP4, and so on.

Another object of the present invention is to provide a multiple screen arrangement, wherein the two or more screens are comprised of at least one first screen and at least one second screen, wherein when not in use, the second screen can be overlappedly aligned with the first screen to form a compact structure, so that the whole device is convenient for storage and transportation.

Another object of the present invention is to provide a multiple screen arrangement, wherein the second screen can be sliding, switching, lifting, popping, folding, unfolding, expanding, spinning, swiveling, retracting, twisting, flipping, pressing, pulling, pushing, hinging, unhinging, bending, moving, leaning, turning, touching, snapping, rotating, rolling, stretching, collapsing, releasing, slipping, elongating etc. from the first screen to enlarge the viewing screen area or provide another viewing window other than the window provided by the first screen.

Another object of the present invention is to provide a multiple screen arrangement, wherein the first screen may be a stationary screen while the second screen may be a movable screen that is capable of moving between the rest state and the operation state. Alternatively, both of the first and second screens can be moved so as to provide the two viewing windows for the user. In other words, one or more of the screens of the multiple screen arrangement of the present invention can be moved.

Another object of the present invention is to provide a multiple screen arrangement, wherein when not in use, the second screen may be stored in a hidden manner, so as to save room and space.

Another object of the present invention is to provide a multiple screen arrangement, wherein the first screen can be integrated with the mobile device while the second screen is movably coupled with a mobile device, or both of the two screens can be movably, slidably or rotatably coupled with the mobile device, so as to form a compact structure and also is convenient to use.

Another object of the present invention is to provide a multiple screen arrangement, wherein the user is able to view different programs or simultaneously run applications on different screens, so that it is convenient for a user to complete multiple tasks at the same time.

Another object of the present invention is to provide a multiple screen arrangement, wherein one or more of the multiple screens can be moved, slid or rotated in such a manner that the multiple screens can be centered on the mobile device, so that the user is easy to view the multiple screens.

Another object of the present invention is to provide a multiple screen arrangement, wherein when one of the screens is damaged, the additional screen (s) will still work, so that it will not affect the user's ability to work.

Another object of the present invention is to provide a multiple screen arrangement, wherein the two or more screens can be fixed to the mobile device or the two or more screens can be detachably mounted to the mobile device, so that the assembling of the multiple screen arrangement is easy.

Another object of the present invention is to provide a multiple screen arrangement, wherein the multiple screen arrangement can be an independent device for equipping with the mobile device, so the multiple screen arrangement can be connected to the mobile device via wireless connection such as pairing with Bluetooth, Mirroring, Wi-Fi, NFC, 3G, 4G, or 5G, Mirroring, or a wire connection, so that the multiple screen arrangement is an add-on device for the mobile device, and there is no need for altering the original structure of the mobile device.

Another object of the present invention is to provide a multiple screen arrangement, wherein each of the screens can be a projection screen and a touch screen that enables the user to operate the mobile device or computers electronically linked with the multiple screen arrangement.

Another object of the present invention is to provide a multiple screen arrangement, wherein a software or application (APP) can be downloaded thereto for pairing and functioning with one or more mobile devices and computers.

Another object of the present invention is to provide a multiple screen arrangement which further comprises a software or an application (APP) for the mobile devices or computers to be paired and communicated therewith to download for connecting, linking, and/or pairing the mobile device or computer with the multiple screen arrangement in such a manner that display output signals of the mobile device or computer can be received by the multiple screen arrangement to display.

Another object of the present invention is to provide a multiple screen arrangement, wherein the multiple screen arrangement can be provided with a battery inside so that it can supply its own power or be used as a portable charger or extra battery for the mobile device.

Another object of the present invention is to provide a multiple screen arrangement, wherein no complicated structure is required, and the use of the multiple screens is easy and convenient, and the cost is low, so that it can be widely used and is also affordable for the customers.

Additional advantages and features of the invention will become apparent from the description which follows, and may be realized by means of the instrumentalities and combinations particular pointed out in the appended claims.

According to the present invention, the foregoing and other objects and advantages are attained by a method for providing a multiple screen arrangement for a mobile device which comprises the following steps:

(a) Provide at least one first screen that incorporates with the mobile device; and (b) Movably arrange at least one second screen with respect to the first screen in such a manner that the second screen moves between a rest state in which the second screen is overlapped and/or aligned with the first screen and an operation state in which the first and second screens are arranged alongside for providing two or more viewing windows for the mobile device.

In accordance with another aspect of the invention, the present invention provides a multiple screen arrangement for a mobile device, comprising a screen module and a communication module for communicatively and electronically linking the screen module with the mobile device.

The screen module comprises first and second screens movably coupled with each other between a first state and a second state, wherein at the first state, the second screen is overlapped behind the first screen in a single screen size manner, and at the second state, the first and second screens are moved side-by-side to provide two viewing windows.

The communication module is adapted for receiving data from the mobile device to be displayed on at least one of the first and second screens, such that the first and second screens are adapted for selectively displaying the data from the mobile device between the first state and the second state.

In accordance with another aspect of the invention, the present invention comprises a computerized working station comprising a screen module and a processor unit.

The screen module comprises first and second screens movably coupled with each other between a first state and a second state, wherein at the first state, the second screen is overlapped behind the first screen in a single screen size manner, and at the second state, the first and second screens are moved side-by-side to provide two viewing windows.

The processor unit is operatively linked to the screen module for processing data to be displayed on at least one of the first and second screens.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
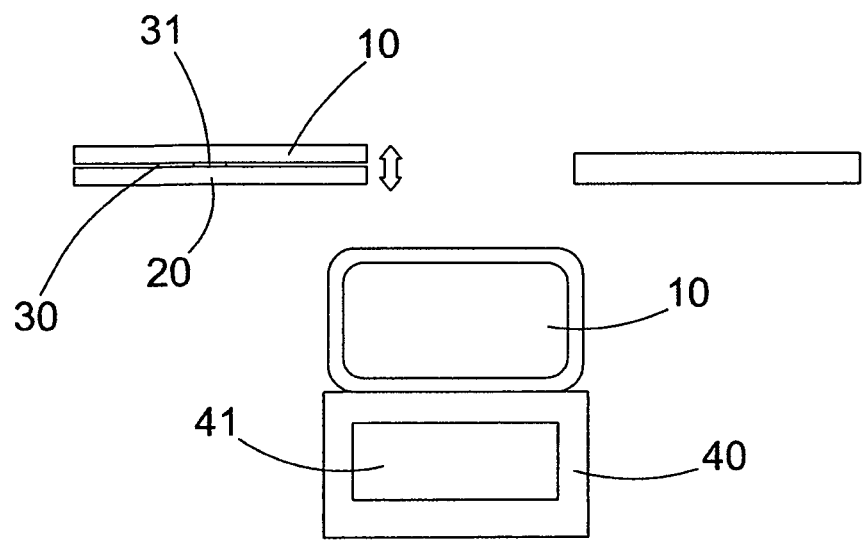
FIG. 1 illustrates a perspective view of a method for providing a multiple screen arrangement according to a first preferred embodiment of the present invention.
Figure 2:
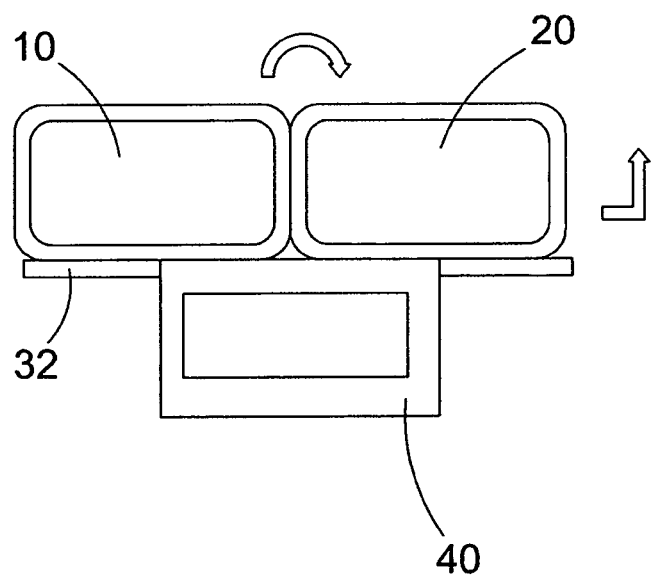
FIG. 2 illustrates a perspective view illustrating the first and second screens being centered for displaying according to the above first preferred embodiment of the present invention.

Referring to FIGS. 1 to 2 of the drawings, a multiple screen arrangement according to a first preferred embodiment of the present invention is illustrated. The method actually provides a multiple screen arrangement comprises two or more screens. In this preferred embodiment, the multiple screen arrangement comprises two screens, i.e. a first screen 10 and a second screen 20.

Accordingly, in this method, the first and second screens 10 and 20 are arranged to incorporate with a mobile device 40 via a mounting mechanism 30. The mobile device 40 can be a mobile device such as a smart phone, a tablet computer, a laptop computer, and other mobile devices or handheld devices. Alternatively, the first and second screens 10 and 20 may also couple with an immobile device, for example, the mobile device 40 may be embodied as a desktop computer.

More specifically, when the second screen 20 is not in use, the first and second screens 10 and 20 are arranged to overlap with each other. As shown in FIG. 1 of the drawings, the slim first and second screens 10 and 20 are snapped together and sit behind each other to look like it is one screen. Accordingly, in this preferred embodiment of the present invention, the first screen 10 can be embodied as a first screen mounted to the mobile device 40, the second screen 20 can be a second movable screen that can be moved from different states to align with the first screen 10.

According to this preferred embodiment, the first and second screen 10 and 20 are coupled with each via a snapping element 31 of the mounting mechanism 30. As shown in FIG. 2 of the drawings, when the first and second screen 10 and 20 unsnaps, the first and second screen 10 and 20 can be arranged alongside with each other. In other words, the screens 10 and 20 unsnap and can be provided in front of the typing interface/keyboard 41 of the mobile device 40.

In this preferred embodiment, the mobile device is shown to be a laptop computer or a monitor. It is worth mentioning that the mounting mechanism 30 further provides at least one slidable rail 32 for the first and second screens 10 and 20. When the second screen 20 is released from the overlapping state and unsnaps from the first screen 10, the first and second screens 10 and 20 can slide out in opposite direction along the slidable rail 32 on the bottom to center the first and second screens 10 and 20 directly in front of the keyboard 41. The second screen 20 may possibly rotate up to 360 degrees when snapping in position. It is worth mentioning that the two screens 10 and 20 also snap in place and lock in position so they don't slide around when in use. In other words, according to this preferred embodiment, the second screen 20 can unsnap from the rest state to align with the first screen 10, both of the first and second screens 10 and 20 can slide along the slidable rail 32 so that the first and second screens become centered so as to make viewing the multiple screen arrangement easier.

Therefore, two screens 10 and 20 are presented in front of the user, so that the user can view the two screens 10 and 20 at the same time. For example, when the user has to complete two or more tasks or run two or more applications, he may use the first screen 10 for displaying a first application and use the second screen 20 for displaying a second application, so that it is convenient for a user to control all of the tasks and the applications. However, for a conventional device with only a single screen, the user has to shift between different viewing windows in the screen, the user may feel inconvenienced and also errors may easily occur when transposing data.

More specifically, as a further specific example, the two screens 10 and 20 can be arranged for playing games. The first screen 10 displays a first view picture illustrating a first location in the game and the second screen 20 displays a second view picture illustrating a second location in the game, so that the player can control and hold the overall situation of the game.

Accordingly, the second screen 20 can be provided for providing an extra viewing window other than the window provided by the first screen. However, it is worth mentioning that the first and second screens 10 and 20 also can be arranged for enlarging the viewing window. More specifically, when the first screen 10 is not large enough to clearly show the content for the mobile device, the second screen 20 unsnaps to increase the size of the display screen. When not in use, the second screen 20 can be returned to its original position that is overlapped with the first screen 10.

It is worth mentioning that the first and second screens 10 and 20 of the present invention can be the same structure such as LCD or LED monitor, or the second screen 20 can be made to be a flexible or bendable monitor. In addition, when the second screen 20 is overlapped with the first screen 10 in a back to back manner, both of the first and second screens 10 and 20 also can be used to display same content for different users on different sides.

It is worth mentioning that each of the first and second screen 10 and 20 of the present invention can be projection screen or be made from touch screen that enables the user to operate the mobile device or computers electronically linked with the multiple screen arrangement.

In this preferred embodiment, the two screens 10 and 20 are connected to look and function like a single screen until the second screen 20 unsnap from the first screen 10. Accordingly, the unsnapping process can be also achieved by many manners. For example, the two screens 10 and 20 are spring released on the top and the bottom to allow the second screen 20 behind the first screen 10 to slide out and the first screen 10 slides along the other direction to connect in the middle for centered viewing.

When in use, the first screen is turned on or powered on for providing a viewing window, and when the second screen requires use, the second screen is powered by switching on a power button, so that it will not waste power. In addition, when both of the two screens 10 and 20 are in use, the user may choose a screen to be a primary screen. For example, the screens 10 and 20 can be touch screens or projection screens, when the user touches the first screen 10, and the first screen 10 becomes the primary screen that the user is working on, and touch the second screen 20, the primary screen will switch back to the second screen 20.

Providing two screens 10 and 20 will enable the user to control two applications on a single computer or hard drive of another computer through Bluetooth, Mirroring, cable, or network access control such as Wi-Fi, NFC, or mobile network such as 3G network, 4G network, and 5G network. The same keyboard 41 can be used for different mobile devices such as computers and the two screens 10 and 20. As a specific embodiment, when a computer is equipped with the multiple screen arrangement, in wire connection or wireless connection, the present invention allows for mobility to only have to carry one computer to access many computers or applications.

In addition, when one of the first and second screens 10 and 20 is damaged and fails to work, the other one, which may serve as a back-up screen, can be switched on, so that the normal operation of the mobile device 40 will not be affected.

It is worth mentioning that when the multiple screen arrangement of the present invention is embodied as an independent device for coupling with the mobile device 40 via wire connection or wireless connection, it also can be provided with a battery inside so that it can supply its own power or be used as a portable charger or extra battery for the mobile device. Therefore, the multiple screen arrangement coupled with the mobile device 40 via wire connection may also consume the power source of the mobile device 40 to supply its power if required.

Figure 3:
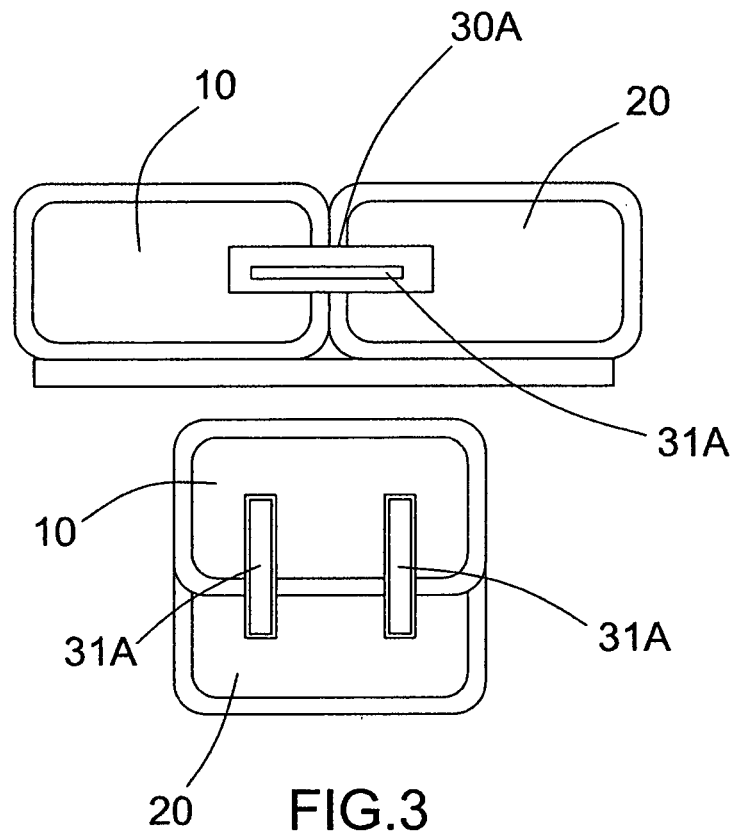
FIG. 3 illustrates a perspective view of a method for providing a multiple screen arrangement according to a second preferred embodiment of the present invention.

Referring to FIG. 3 of the drawings, a multiple screen arrangement according to a second preferred embodiment of the present invention is illustrated. In this preferred embodiment, the mounting mechanism 30A comprises one or more folding or sliding brackets 31A which is attached to the back of each of the first and second screens 10 and 20.

Accordingly, in this preferred embodiment, the two screens slide to present both of the two screens 10 and 20 via the bracket 31A. As shown in FIG. 3 of the drawings, the two screens 10 and 20 may slide along a horizontal direction or may slide along a vertical direction. Therefore, the second screen 20 slides from the back like a drawer in opposite directions to join in the middle.

Figure 4:
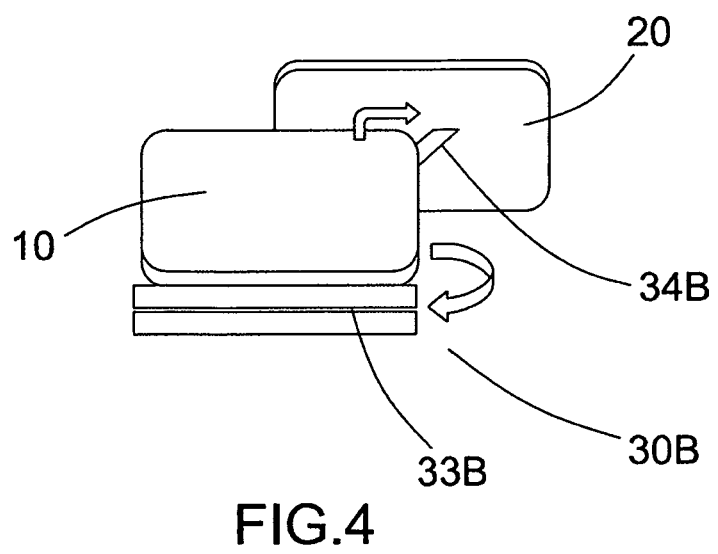
FIG. 4 illustrates a perspective view of a method for providing a multiple screen arrangement according to a third preferred embodiment of the present invention.
Figure 5:
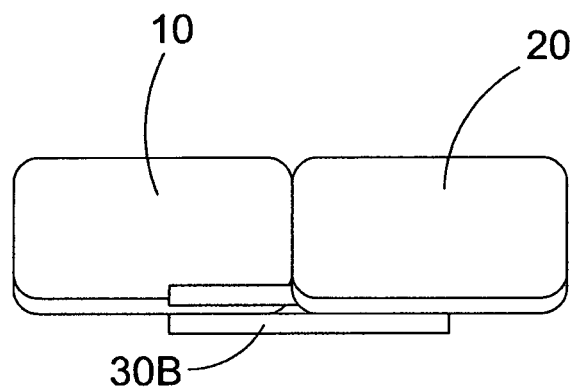
FIG. 5 illustrates a perspective view illustrating the first and second screens being centered for displaying according to the above third preferred embodiment of the present invention.

Referring to FIGS. 4 and 5 of the drawings, a multiple screen arrangement according to a third preferred embodiment of the present invention is illustrated. In this preferred embodiment, the mounting mechanism 30B comprises a control arm 34B. The second screen 20 pulls off and rotates around the side via the control arm 34A and fits into a sliding opening 33B next to the first screen. When the screens slide down, the two screens 10 and 20 become centered. The two screens 10 and 20 can be arranged in an end-to-end manner, so that the two screens 10 and 20 form an elongated large screen.

Figure 6:
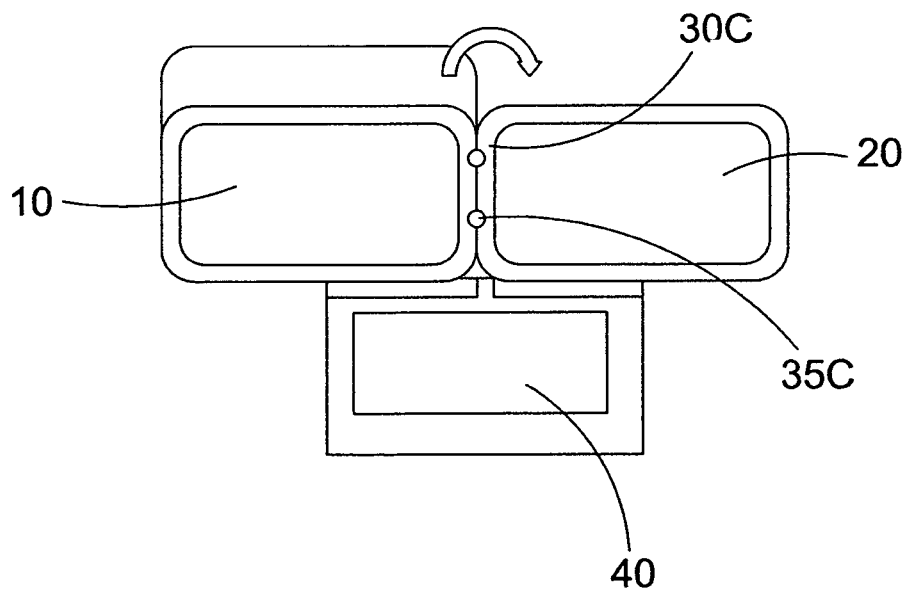
FIG. 6 illustrates a perspective view of a method for providing a multiple screen arrangement according to a fourth preferred embodiment of the present invention.

Referring to FIG. 6 of the drawings, a multiple screen arrangement according to a fourth preferred embodiment of the present invention is illustrated. In this preferred embodiment, the mounting mechanism 30C comprises one or more control hinge member 35C. The second screen is facing the opposite direction so that the whole device comprises a screen on each side. The second screen 20 is provided with the hinge member 35C that opens up and fits into a slider at the top of the bottom part of the mobile device such as a laptop 40. The first screen 10 and the second screen 20 slides down to opposite direction so that the two screens 10 and 20 both end in the center.

Figure 7:
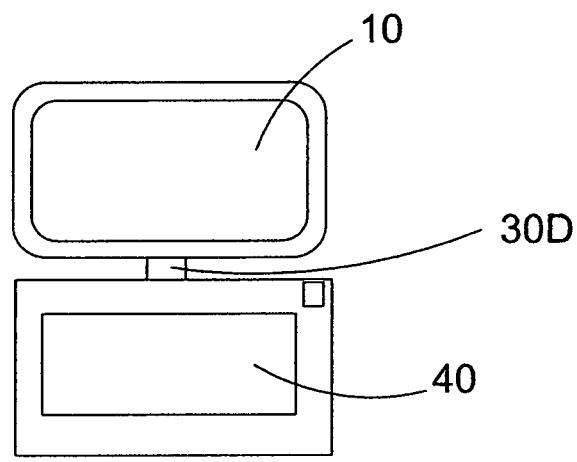
FIGS. 7 and 8 illustrate a method for providing a multiple screen arrangement according to a fifth preferred embodiment of the present invention.
Figure 8:
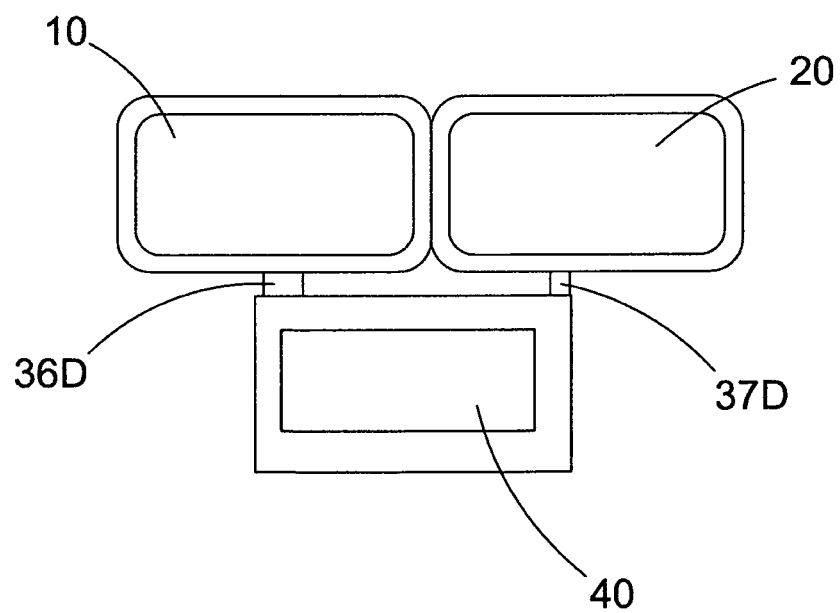

Referring to FIGS. 7 and 8 of the drawings, a multiple screen arrangement according a fifth preferred embodiment of the present invention is illustrated. In this preferred embodiment, the mounting mechanism 30D comprises a sliding member 36D and a support member 37D. When the second screen 20 is not in use, it can be hidden behind the first screen 10. Accordingly, when sliding the first sliding member 36D which is coupled with the first screen 10 to the far left side, the support member 37D lifts up from the bottom to support the second screen 20 so that the two screens 10 and 20 are arranged alongside for providing two viewing windows. Accordingly, the second screen 20 also may serve as an attachment.

Figure 9:
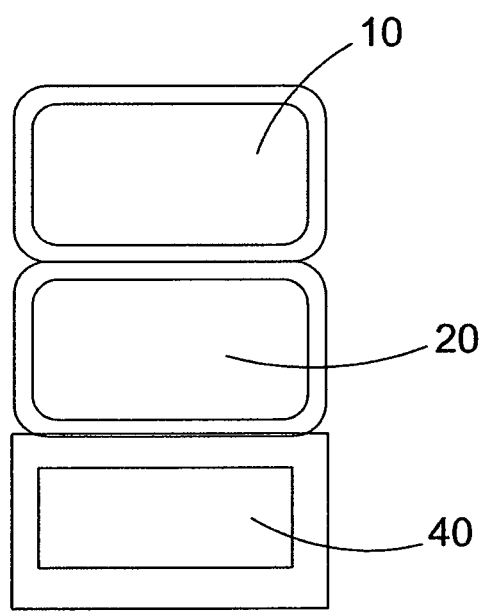
FIG. 9 illustrates an alternative mode of the method for providing a multiple screen arrangement according to the above fifth preferred embodiment of the present invention.

According to an alternative mode shown in FIG. 9 of the drawings, when the second screen 20 is not in use, it can be hidden within the mobile device 40. When the first screen 10 is pulled apart from the mobile device 40, the second screen 20 is elevated up so that the second screen 20 moves to a position between the mobile device 40 and the first screen 10. Referring to FIG. 9 of the drawings, as an example, the second screen 20 can be provided below the first screen 10 when in use.

Figure 10:
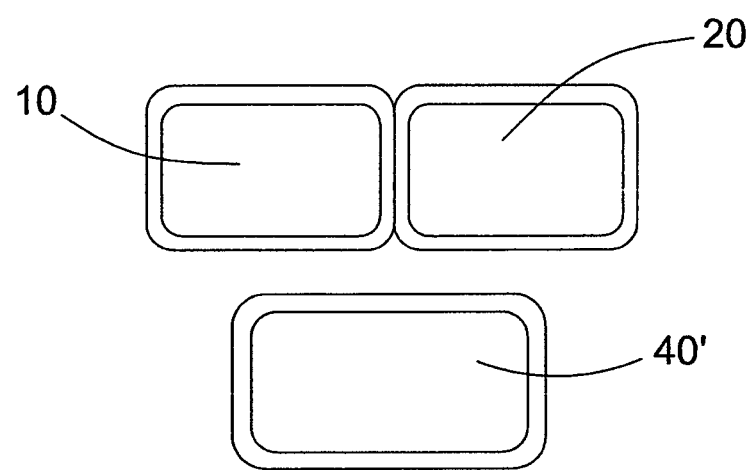
FIG. 10 illustrates a perspective view of a method for providing a multiple screen arrangement according to a sixth preferred embodiment of the present invention.

Referring to FIG. 10 of the drawings, a multiple screen arrangement according to a sixth preferred embodiment of the present invention is illustrated. In this preferred embodiment, the multiple screen arrangement may serve as an after-market screen attachment for tablet computers or mobile phones.

It is worth mentioning that the tablet or the phone may work as the keyboard 41 discussed in the above preferred embodiment. The multiple screen arrangement of this preferred embodiment can be set up in front of the tablet or the phone so as to provide a dual screen for enlarging the viewing area or providing another viewing window.

Figure 11:
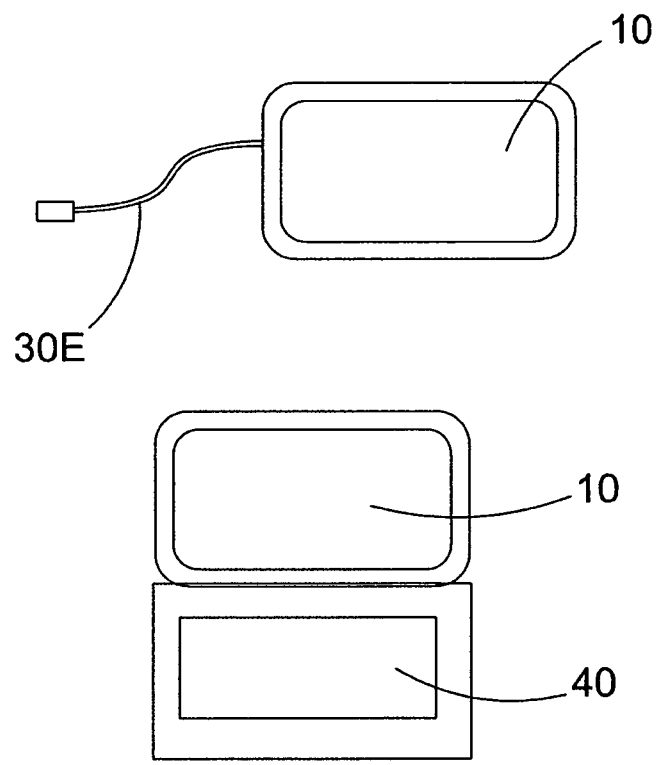
FIG. 11 illustrates a perspective view of a method for providing a multiple screen arrangement according to a seventh preferred embodiment of the present invention.

Referring to FIG. 11 of the drawings, a multiple screen arrangement according to a seventh preferred embodiment of the present invention is illustrated. Similarly, the multiple screen arrangement may be a plug-in device, or may be connected to the tablet computers or mobile phones via wireless connection. Accordingly, the mounting mechanism 30E can be a connecting cable that connects the second screen 20 with the first screen 10. According to a specific example, the multiple screen arrangement may be arranged with a mobile applicant device 40' such as a computer or sold as aftermarket accessory. The computer can slide to hold both or the screens can be a free standing option.

Figure 12:
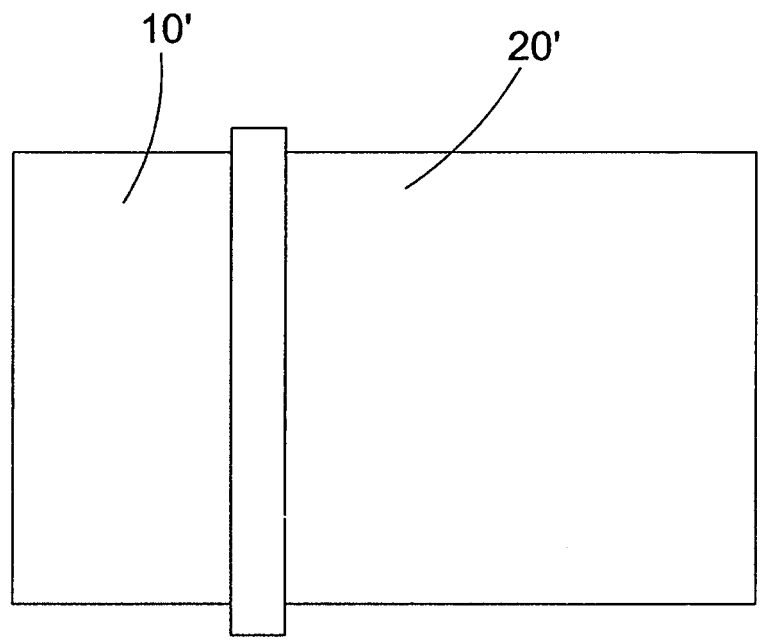
FIG. 12 illustrates a perspective view of a method for providing a multiple screen arrangement according to an eighth preferred embodiment of the present invention.
Figure 13:
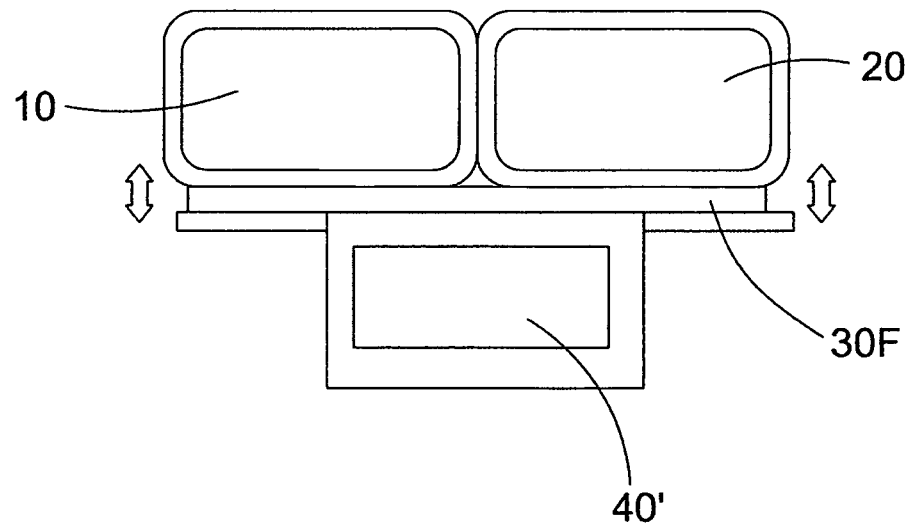
FIGS. 13 and 14 illustrate a perspective view of a method for providing a multiple screen arrangement according to a ninth preferred embodiment of the present invention.

Referring to FIG. 12 of the drawings, a multiple screen arrangement according to an eighth preferred embodiment of the present invention is illustrated. The two screens are bendable screens, so that the two screens 10' and 20' can roll up into a box and may leave from opposite sides. Referring to FIG. 13 of the drawings, a multiple screen arrangement according to a seventh preferred embodiment of the present invention is illustrated. In this preferred embodiment, the two screens 10 and 20 can be elevated so that the height of the two screens 10 and 20 can be adjusted.

Figure 14:
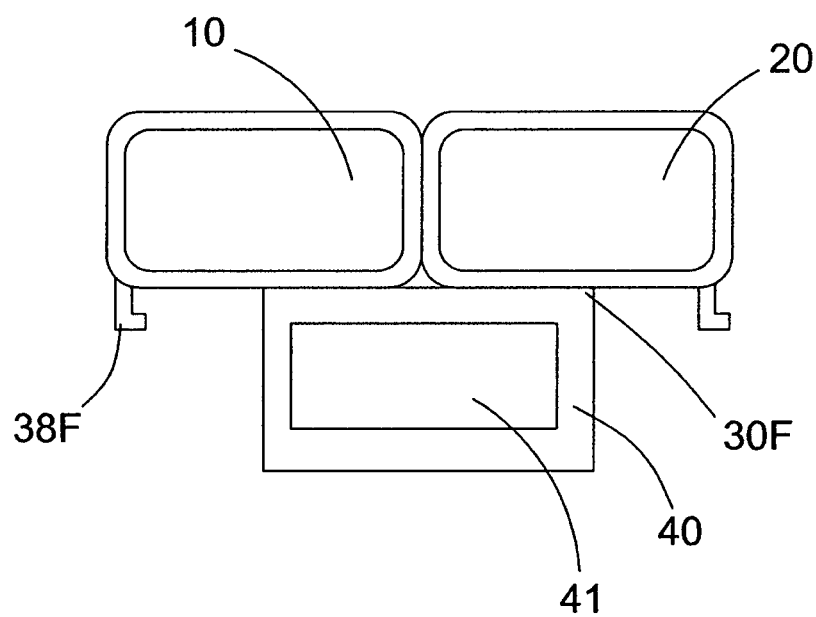

Referring to FIGS. 13 and 14 of the drawings, a multiple screen arrangement according to a ninth preferred embodiment of the present invention is illustrated. In this preferred embodiment, when in the operation state, the first and second screens 10 and 20 slide to become centered on the mobile device 40 which can be embodied as a computer (e.g. a desktop computer, a laptop computer, or a tablet computer), and at least one stand 38F folds/rotates down to support at least one of the first and second screens 10 and 20. In other words, the stand 38F may retain one or more screens of the multiple screen arrangement in position when one or more screens are in the operation state. Accordingly, a viewing angle of the multiple screen arrangement with respect to the user can be varied by adjusting the position of the stand 38F.

Accordingly, the multiple screen arrangement for a mobile device comprises the following steps.

(a) Provide at least one first screen 10 that incorporates with the mobile device 40.

(b) Movably arrange at least one second screen 20 with respect to the first screen 10 in such a manner that the second screen 20 moves between a rest state in which the second screen 20 is overlapped and/or aligned with the first screen 10 and an operation state in which the first and second screens 10 and 20 are arranged alongside for providing two or more viewing windows for the mobile device 40.

The step (a) may comprise a step of integrating the first screen 10 with the mobile device. Alternatively, the step (a) may comprise a step of movably mounting the first screen 10 with the mobile device 40.

The step (b) may comprise a step of sliding the second screen 20 from behind of the first screen 10 so as to stand alongside with the first screen 10.

Alternatively, the step (b) may comprise a step of folding the second screen 20 from behind of the first screen 10 so as to stand alongside with the first screen 10.

Alternatively, the step (b) may comprise a step of rotating the second screen 20 from behind of the first screen 10 so as to stand alongside with the first screen 10.

Alternatively, the step (b) may comprise a step of flipping the second screen 20 from behind of the first screen 10 so as to stand alongside with the first screen 10.

Alternatively, the step (b) may comprise a step of elevating the second screen 20 from behind of the first screen 10 so as to stand alongside with the first screen 10.

In the step (b), the two or more screens may be arranged along a horizontal direction or along a vertical direction when in the operation state. The two screens may provide an integral enlarged view or two independent viewing windows.

The two or more screens may be detachably mounted with the mobile applicant device, and may connect with the mobile applicant device via wire connection or wireless connection such as pairing with Bluetooth, Mirroring, Wi-Fi, NFC, 3G, 4G and 5G.

The method may further comprise a step of providing a battery in the multiple screen arrangement so as to supply its power or be used as a portable charger or extra battery for the mobile device.

Figure 15:
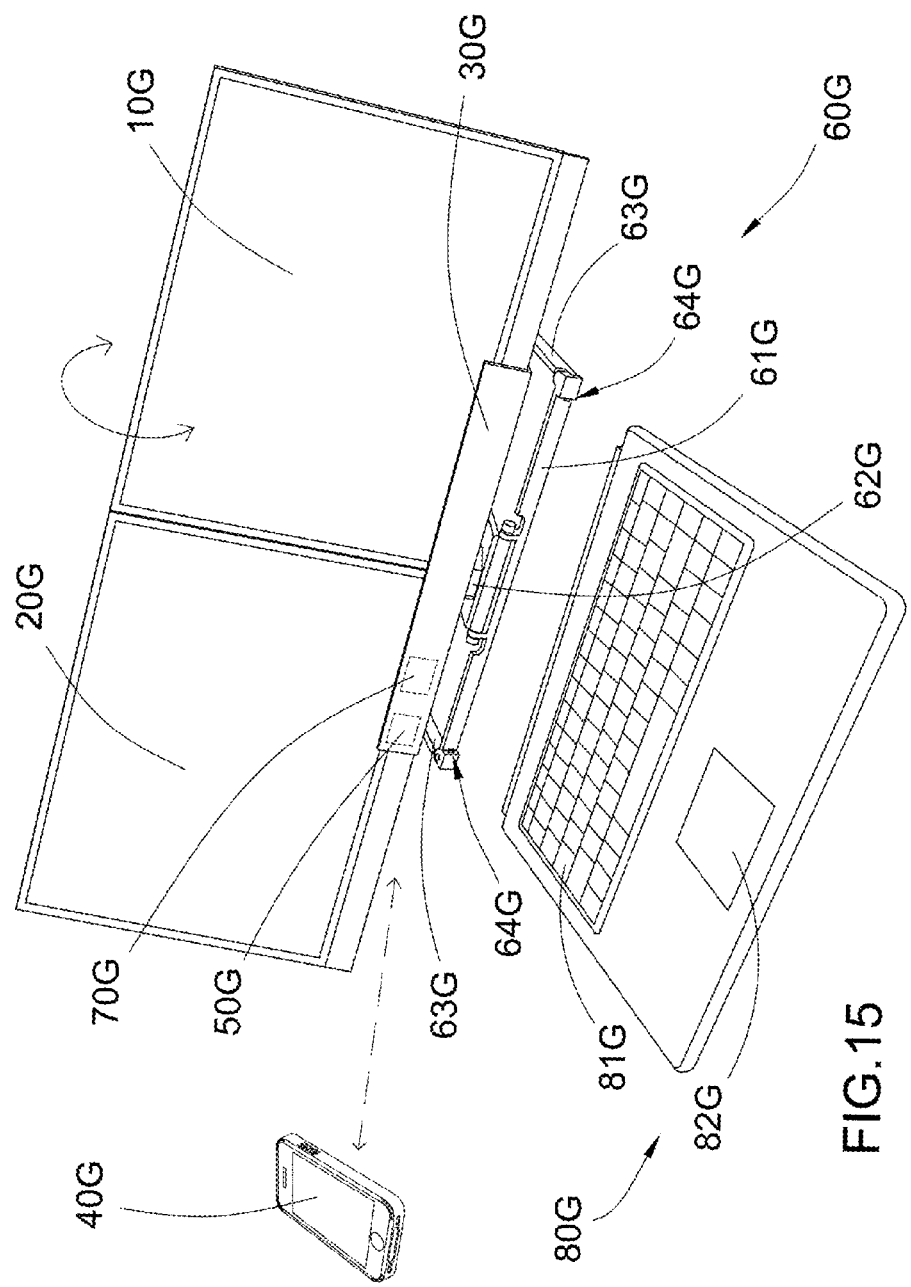
FIG. 15 is a perspective view of a multiple screen arrangement according to a tenth preferred embodiment of the present invention, illustrating the screen module at a second state.
Figure 16:
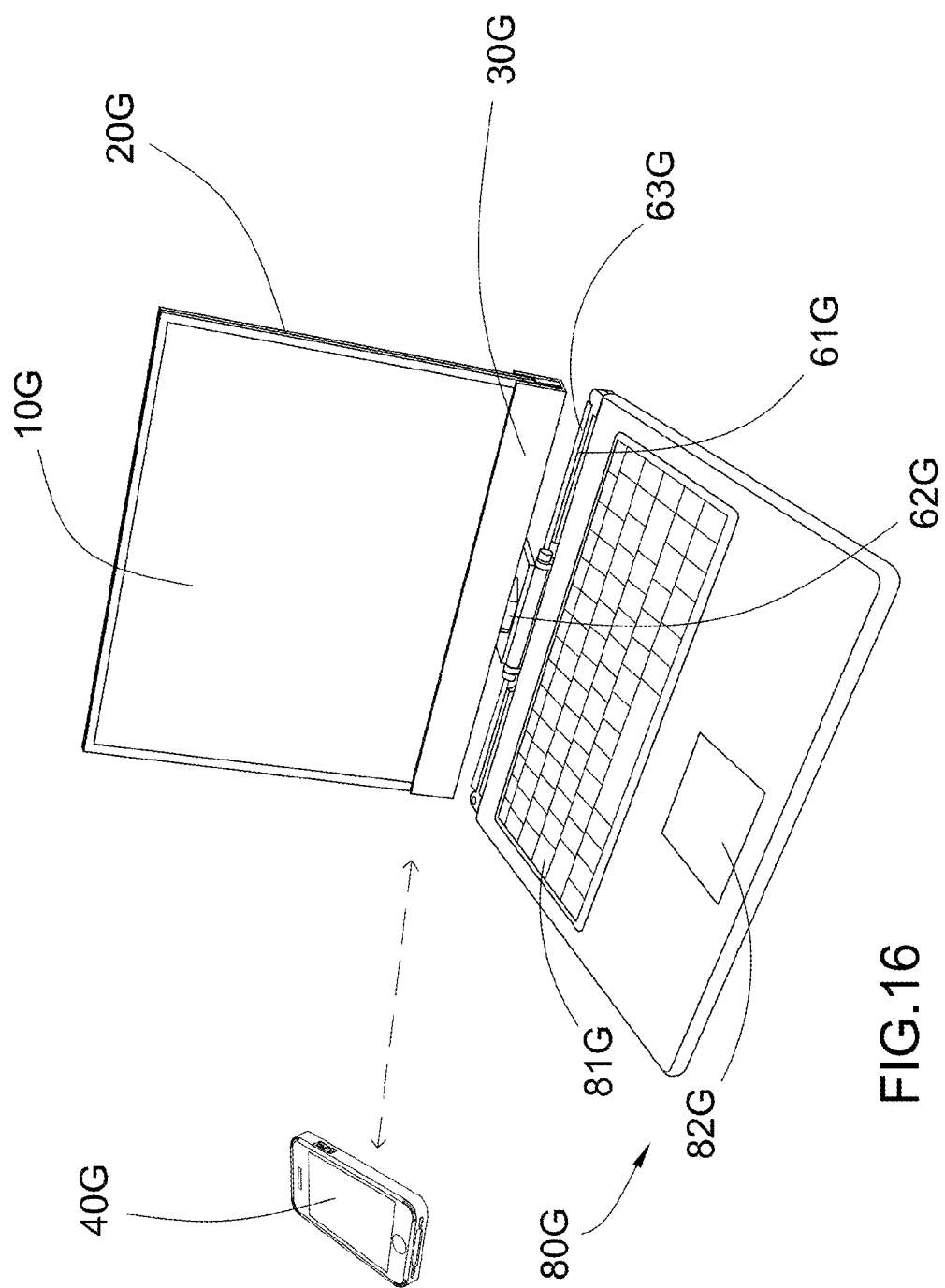
FIG. 16 is a perspective view of the multiple screen arrangement according to the above tenth preferred embodiment of the present invention, illustrating the screen module at a first state.
Figure 17:
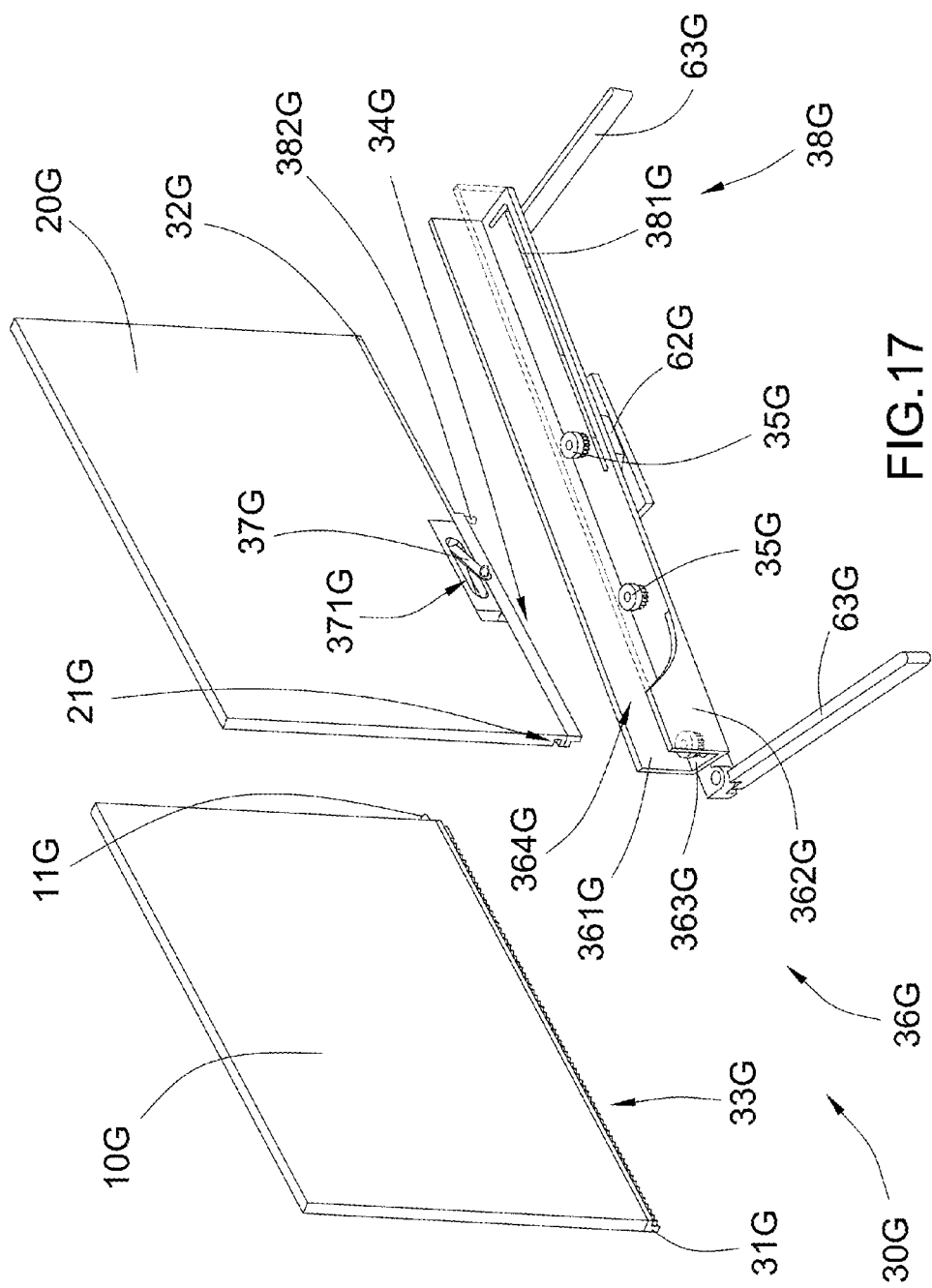
FIG. 17 is an exploded perspective view of the multiple screen arrangement according to the above tenth preferred embodiment of the present invention.

As shown in FIGS. 15 to 17, a multiple screen arrangement according to an eleventh embodiment illustrates an alternative of the above embodiments of the present invention. Accordingly, the multiple screen arrangement comprises a screen module and a communication module 50G for communicatively linking the screen module with the mobile device 40G.

The screen module comprises first and second screens 10G, 20G movably coupled with each other between a first state and a second state. In particular, at the first state, the second screen 20G is overlapped behind the first screen 10G in a single screen size manner. At the second state, the first and second screens 10G, 20G are moved side-by-side to provide two viewing windows. Preferably, the first and second screens 10G, 20G are identical that the screen size of the first screen 10G is the same as the screen size of the second screen 20G. Therefore, when the second screen 20G is overlapped behind the first screen 10G, the first and second screens 10G, 20G form a single screen size that the thickness of the screen module at the second state is the overall thickness of the first and second screens 10G, 20G.

The communication module 50G can be built-in with each of the first and second screens 10G, 20G to communicatively link the first and second screens 10G, 20G with each other. Accordingly, the communication module 50G is adapted for receiving data from the mobile device 40G to be displayed on at least one of the first and second screens 10G, 20G, such that the first and second screens 10G, 20G are adapted for selectively displaying the data from the mobile device 40G between the first state and said second state. Preferably, only the first screen 10G displays the data from the mobile device 40G at the first state while both the first and second screens 10G, 20G display the data from the mobile device 40G at the second state. The mobile device 40G can be communicatively linked to the screen module via the communication module 50G by wire or wireless means such as Bluetooth, Mirroring, Wi-Fi, NFC, 3G mobile network, 4G mobile network, or 5G mobile network. In other words, the communication module 50G comprises a signal receiver to receive data as a display signal from the mobile device 40G to be displayed on the first and second screens 10G, 20G.

It is worth mentioning that the mobile device 40G preferably is a smart phone, wherein the user is able to install an application or software in the mobile device 40G to communicate with the screen module through the communication module 50G. Accordingly, the user is able to control the data to be displayed on each of the first and second screens 10G, 20G, via the application. In particular, when the first and second screens 10G, 20G are moved at the second state, the user is able to selectively display different data on the viewing windows of the first and second screens 10G, 20G. For example, the user is able to execute the application to select the first data, such as a video in the mobile device 40G, to be display on the first screen 10G and the second data, such as an internet browser in the mobile device 40G, to be display on the second screen 20G. It is worth mentioning the data displayed on the mobile device 40G can be directly shown on one of the first and second screens 10G, 20G by screen mirroring or other technologies, such as "Airplay".

Figure 18:
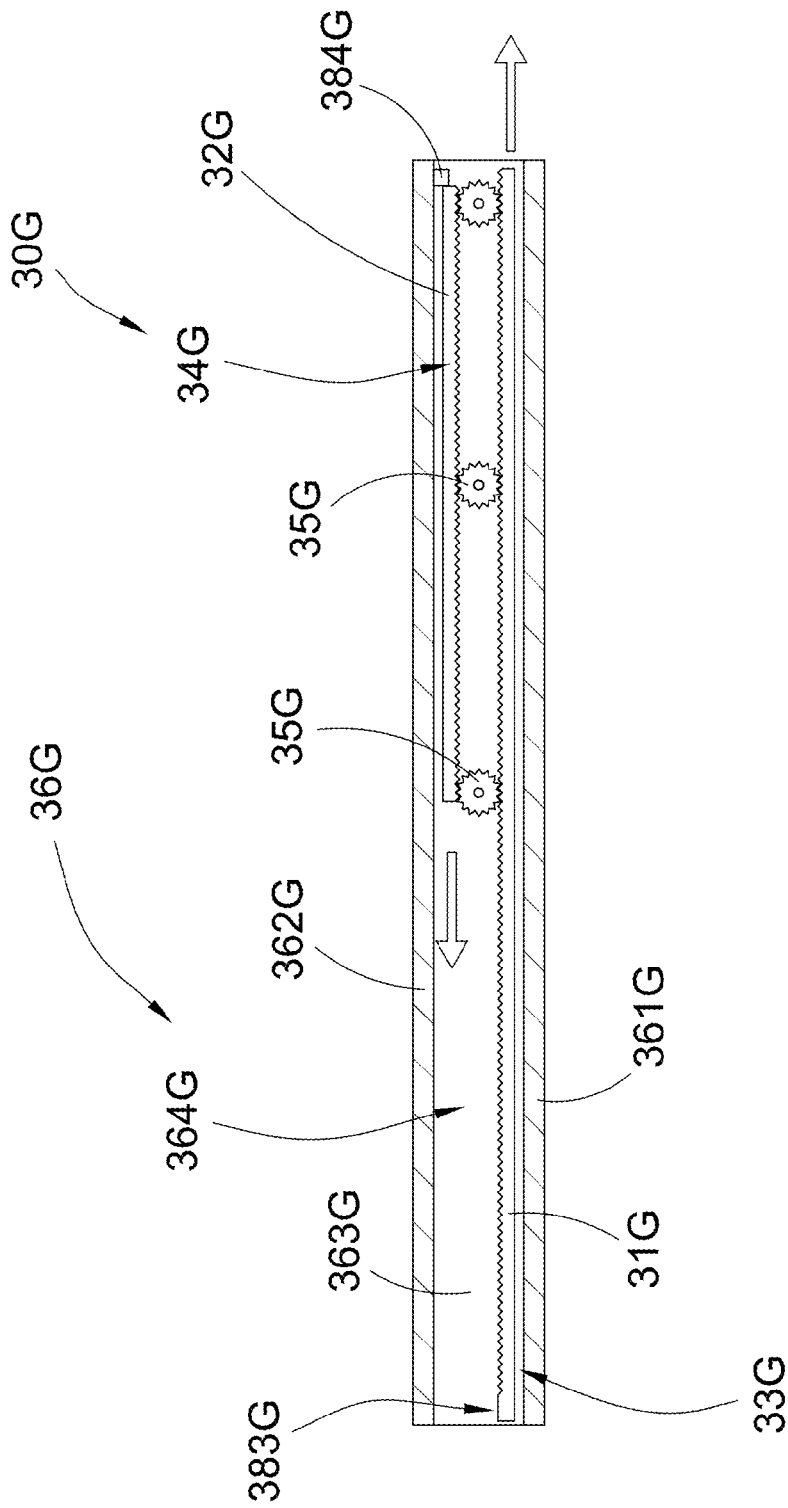
FIG. 18 illustrates a sliding mechanism of the multiple screen arrangement according to the above tenth preferred embodiment of the present invention, illustrating the engagement between the slidable rails and the driven gear.

As shown in FIGS. 17 and 18, the multiple screen arrangement further comprises a mounting mechanism 30G for moving the first and second screens 10G, 20G between the first state and the second state. In particular, the first and second screens 10G, 20G are synchronically moved between the state and the second state via the mounting mechanism 30G. Accordingly, the mounting mechanism 30G comprises a first slidable rail 31G and a second slidable rail 32G for slidably engaging with bottom portions of the first and second screens 10G, 20G respectively. Preferably, the first and second slidable rails 31G, 32G are provided along the bottom edges of the first and second screens 10G, 20G respectively. When the first and second screens 10G, 20G are slid toward each other, the first and second screens 10G, 20G are moved to overlap with each other at the first state. When the first and second screens 10G, 20G are slid away from each other, the first and second screens 10G, 20G are moved side-by-side at the second state.

In order to move the first and second screens 10G, 20G in a synchronized manner, the mounting mechanism 30G further comprises a plurality of first gearing teeth 33G provided along the first slidable rail 31G, a plurality of second gearing teeth 34G provided along the second slidable rail 32G, and a plurality of driven gears 35G operatively engaged between the first gearing teeth 33G and the second gearing teeth 34G to synchronize the sliding movements of the first and second screens 10G, 20G. Accordingly, the first and second slidable rails 31G, 32G are parallel with each other at a position that the first and second gearing teeth 33G, 34G are facing each other, such that the driven gears 35G are located between the first and second slidable rails 31G, 32G to engage with the first and second gearing teeth 33G, 34G. Therefore, when the first screen 10G is slid between the first and second states, the second screen 20G is driven to correspondingly slide between the first and second states via the driven gears 35G. It is worth mentioning that the driven gears 35G are driven to rotate by the sliding movements of the first and second screens 10G, 20G. In other words, when the first screen 10G is slid at one direction, the second screen 20G slides at the opposite direction.

According to the preferred embodiment, the mounting mechanism 30G further comprises a sliding bracket 36G having a U-shaped cross section and defining a front wall 361G, a rear wall 362C, and a bottom wall 363G, wherein a sliding channel 364G is formed within the front wall 361G, the rear wall 362C, and the bottom wall 363G that the first and second slidable rails 31G, 32G are slidably supported between the front and rear walls 361G, 362G of the sliding bracket 36G within the sliding channel 364G thereof.

Accordingly, the driven gears 35G are rotatably supported on the bottom wall 363G of the sliding bracket 36G to engage with the first and second gearing teeth 33G, 34G. It is worth mentioning that the sliding bracket 36G has two side openings, wherein the first and second slidable rails 31G, 32G are opposedly slid to partially extend out of the sliding bracket 36G through the side openings thereof.

Figure 19:
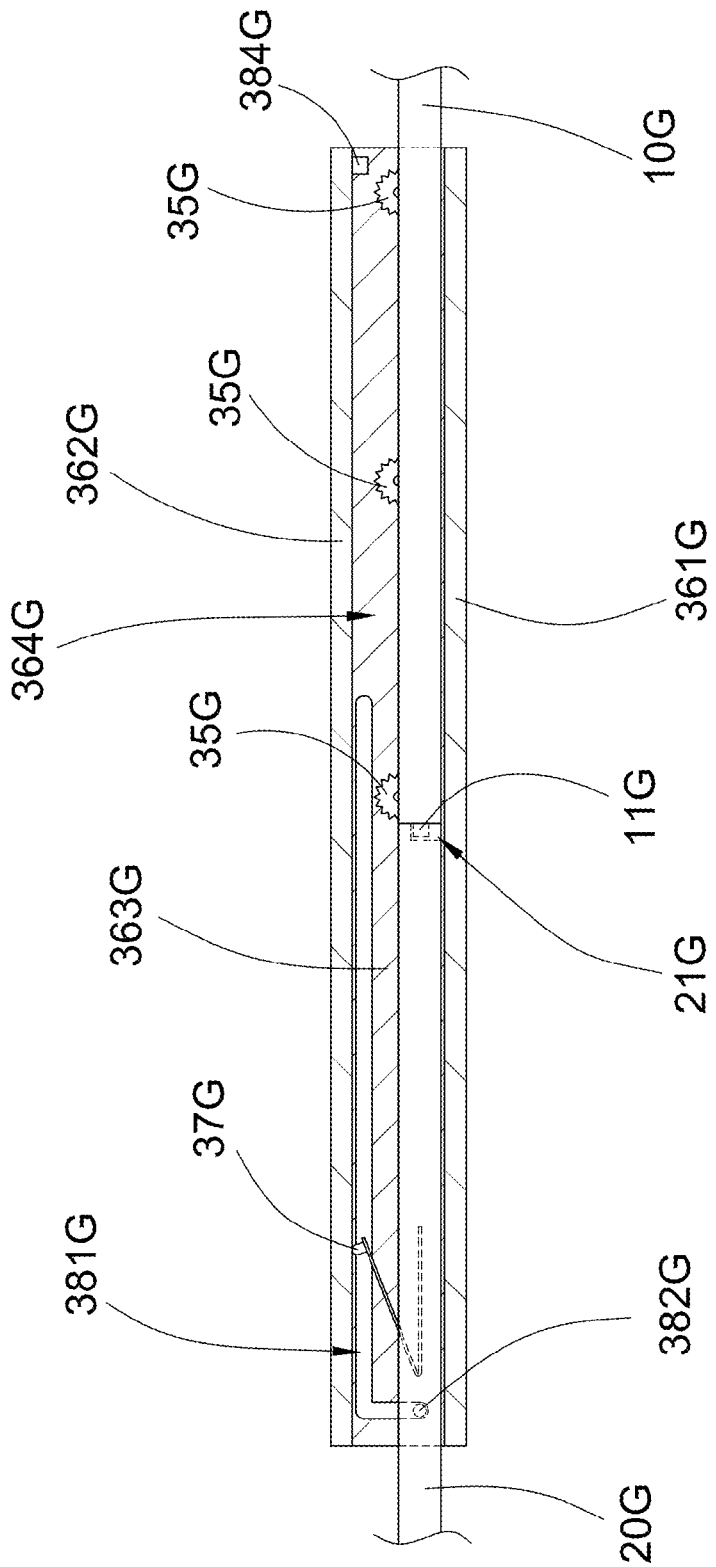
FIG. 19 illustrates the multiple screen arrangement according to the above tenth preferred embodiment of the present invention, illustrating the first and second screens being moved edge-to-edge.

As shown in FIGS. 15 and 19, when the first and second screens 10G, 20G are moved to the second state, the first and second screens 10G, 20G are coupled edge-to-edge in a same planar direction, so as to form an enlarged screen configuration. In order to move the second screen 20G frontwardly to align with the first screen 10G edge-to-edge in the second state, the mounting mechanism 30G further comprises a resilient arm 37G coupled at a rear side of the second screen 20G to bias against the rear wall 362G of the sliding bracket 36G. When the first and second screens 10G, 20G are moved at the first state, the resilient arm 37G is pressed on the rear side the second screen 20G, such that the second screen 20G is slid behind the first screen 10G because of the fixed distance between the front and rear walls 361G, 362G of the sliding bracket 36G. When the first and second screens 10G, 20G are moved at the second state, the resilient arm 37G is biased against the rear wall 362G of the sliding bracket 36G to push the second screen 20G frontward. Therefore, the second screen 20G is frontwardly pushed by the resilient arm 37G to align with the first screen 10G edge-to-edge. In other words, the second screen 20G is pushed rearward until the second screen 20G is located behind the first screen 10G in order to slide the first and second screens 10G, 20G back to the first state. It is worth mentioning that the resilient arm 37G has a first end extended from the rear side of the second screen 20G and a second end extended to bias against the rear wall 362G of the sliding bracket 36G. Preferably, a receiving cavity 371G is formed at the rear side of the second screen 20G, wherein the first end of the resilient arm 37G is extended from an inner wall of the receiving cavity 371G, such that when the second screen 20G is pushed rearward to locate behind the first screen 10G, the resilient arm 37G is received within the receiving cavity 371G.

The mounting mechanism 30G further comprises a guiding arrangement 38G to guide the sliding movements of the first and second screens 10G, 20G. The guiding arrangement 38G comprises a L-shaped guiding slot 381G formed at the bottom wall 363G of the sliding bracket 36G and a sliding guider 382G downwardly protruded from the second slidable rail 32G to slidably engage with the guiding slot 381G. The guiding slot 381 preferably a through slot formed on the bottom wall 363G of the sliding bracket 36G, wherein the guiding slot 381G has an elongated longitudinal portion and an elongated transverse portion extended end-to-end to guide the second screen 20G to slide from the first state to the second state and to guide the second screen 20G to be located edge-to-edge with respect to the first screen 10G. In particular, when the second screen 20G is slid behind the first screen 10G, the sliding guider 382G is guided to slide along the longitudinal portion of the guiding slot 381G. When the second screen 20G is moved frontwardly to align with the first screen 10G edge-to-edge, the sliding guider 382G is guided to slide along the transverse portion of the guiding slot 381G. In other words, the longitudinal portion of the guiding slot 381G is arranged to guide the sideward sliding movement of the second screen 20G while the transverse portion of the guiding slot 381G is arranged to guide the frontward/rearward sliding movement of the second screen 20G.

As shown in FIGS. 17 and 19, the first screen 10G has a first communication terminal 11G and the second screen 20G has a second communication terminal 21G, wherein when the first and second screens 10G, 20G are moved side-by-side at the second state, the first communication terminal 11G is operatively linked to the second communication terminal 21G, so as to operatively link the first and second screens 10G, 20G with each other. Preferably, the first communication terminal 11G is protruded from one edge of the first screen 10G and the second communication terminal 21G is indented from the corresponding edge of the second screen 20G, such that the first communication terminal 11G is slid into the second communication terminal 21G to ensure the first and second screens 10G, 20G to be aligned edge-to-edge. In other words, the first and second communication terminals 11G, 21G not only form a communication means between the first and second screens 10G, 20G but also provide an engagement between the first and second screens 10G, 20G in an edge-to-edge manner.

In order to ensure that the first and second screens 10G, 20G slide in one direction, the guiding arrangement 38G of the mounting mechanism 30G further comprises a first guiding stopper 383G provided at one end of the first slidable rail 31G to ensure the first screen 10G is slid in one direction only, and a second guiding stopper 384G is provided at one of the front and rear walls 361G, 362G of the sliding bracket 36G to ensure the second screen 20G slides in the opposite direction only.

Accordingly, the first guiding stopper 383G is formed at the corresponding end of the first slidable rail 31G, wherein the first screen 10G can only slide in the right direction as an example, so as to block the first screen 10G from sliding in the left direction. The second guiding stopper 384G is preferably formed at the rear wall 362G of the sliding bracket 36G, wherein the second screen 20G can only slide in the left direction corresponding to the right direction of the first screen 10G, so as to block the second screen 20G from sliding in the right direction. It is worth mentioning that the guiding slot 381G will also serve as a stopper means to ensure the second screen 20G will only slide in one direction which is the left direction in this example. In addition, when the first screen 10G is slid in the right direction, the second screen 20G synchronically slides in the left direction.

It is appreciated that the relative movement between the first and second screens in the above embodiments can be sliding, switching, lifting, popping, folding, unfolding, expanding, spinning, swiveling, retracting, twisting, flipping, pressing, pulling, pushing, hinging, unhinging, bending, moving, leaning, turning, touching, snapping, rotating, rolling, stretching, collapsing, releasing, slipping, elongating etc. from the first screen to enlarge the viewing screen area or provide another viewing window other than the window provided by the first screen. In addition, such relative movement between the first and second screens can be moved manually as described above or electrically by providing a power source such as motor.

As shown in FIGS. 15 and 16, the present invention further comprises a foldable stand 60G for supporting the screen module in an upright manner, such that the multiple screen arrangement can form a standalone screen display to link with the mobile device 40G. It is appreciated that the multiple screen arrangement can link to any computer to serve as a display thereof.

According to the preferred embodiment, the foldable stand 60G comprises a supporting arm 61G movably coupled with the mounting mechanism via a foldable joint 62G, and two folding arms 63G pivotally extended from two ends of the supporting arm 61G respectively. Each of the folding arms 63G can be pivotally and inwardly folded to align with a rear side of the supporting arm 61G and can be pivotally and outwardly folded away from the supporting arm 61G. Therefore, the folding arms 63G are outwardly folded from the supporting arm 61G to form a stand to support the screen module in an upright manner and the folding arms 61G are inwardly folded to align with the supporting arm 61G to fold up the foldable stand. It is worth mentioning that the screen module can be revolved 360° via the foldable joint 62G with respect to the supporting arm 61G and can be pivotally folded at a tilt angle via the foldable joint 62G with respect to the supporting arm 61G.

According to the preferred embodiment, the mounting mechanism 30G is provided integrally above the foldable stand 60G to equip with the first slidable rail 31G and the second slidable rail 32G provided at the bottom sides of the first screen 10G and the second screen 20G respectively. It is appreciated that the present invention may further provided an upper guiding rail supported by the foldable stand 60G for further supporting and guiding the top sides of the first and second screens 10G, 20G. It is also worth mentioning that, alternatively, the first slidable rail 31G and the second slidable rail 32G can be provided at the top sides of the first and second screen 10G, 20G respectively and the mounting mechanism 30G can also be arranged in an upper position of the multiple screen arrangement of the present invention, wherein the mounting mechanism 30G can be supported by the foldable stand 60G, wherein, alternatively, the mounting mechanism 30G can also be supported by the sliding bracket 36G while the sliding bracket 36G simply functions as a supporting and guiding rail.

The multiple screen arrangement further comprises a processor unit 70G communicatively linked to the communication module 50G and operatively linked to the screen module for processing the data to be displayed on at least one of the first and second screens 10G, 20G. Accordingly, after the communication module 50G receives the signal from the mobile device 40G, the processor unit 70G will process the signal to be displayed on the first and second screens 10G, 20G. It is worth mentioning that each of the first and second screens 10G, 20G can be a touch screen or a projection screen. For example, with a touch screen when the user touches one of the first and second screens 10G, 20G, the corresponding screen will be activated to display the data from the mobile device 40G. For example, the first screen 10G is arranged for displaying the video from the mobile device 40G and the second screen 20G is arranged for displaying the internet browser from the mobile device 40G. Therefore, when the first screen 10G is touched and activated, the user is able to control the function/operation of the video by the mobile device 40G to be played on the first screen 10G. Likewise, when the second screen 20G is touched and activated, the user is able to control the internet browser from the mobile device 40G to be played on the second screen 20G. It is worth mentioning that the first and second screens 10G, 20G can individually display different data from the mobile device 40G. It is appreciated that the first and second screens 10G, 20G can combine to form an extended screen to extend the screen size of the screen module.

It is appreciated that each of the first screen 10G and the second screen 20G may have two viewing screens respectively provided on the front side and rear side thereof so that when the first and second screens 10G, 20G are combined to form an extended screen, there are totally four viewing screens provided, and that when the second screen 20G is overlapped behind the first screen 10G in a single screen size manner, there still have two viewing screens provided.

Accordingly, the screen module and the processor unit 70G can be combined to form a computerized working station. In particular, the screen module can form the portable working station, wherein the processor unit 70G is adapted to process the data to be displayed on the first and second screens 10G, 20G.

As a working station, the present invention further comprises an input module 80G which is operatively linked to the processor unit 70G and is detachably coupled with the screen module, so as to control the data to be displayed on at least one of the first and second screens 10G, 20G. Accordingly, the input module 80G comprises a keyboard unit 81G and a touch pad unit 82G received at a panel casing. The keyboard unit 81G and the touch pad unit 82G can be operated to select which data is to be displayed on the first and second screens 10G, 20G instead of touching thereon.

It is worth mentioning that the working station can serve as a laptop computer when the working station is communicatively linked to the mobile device 40G. In other words, the screen module and the input module 80G will form a computer accessory to operate the mobile device 40G and to display the data therefrom. Preferably, a docking station 83G is also provided on the input module 80G, such that when the mobile device 40G is operatively connected to the docking station 83G, the present invention will automatically link to the mobile device 40G. Alternatively, the mobile device 40G can be linked via the communication module 50G by wire or wireless connection. It is appreciated that the working station can serve as a standalone laptop computer by providing a CPU and other computerized components.

According to the preferred embodiment, the input module 80G can be coupled with the screen module, such that the screen module can be pivotally and downwardly folded to overlap on the input module 80G via the foldable joint 62G. The screen module can also be pivotally and upwardly folded from the input module 80G at a tilted angle via the folding joint 62G.

In order to provide the detachably attaching feature of the input module 80G, the foldable stand 60G further comprises two locking units 64G provided at the ends of the supporting arm 61G respectively to lock up the input module 80G at the supporting arm 61G. In particular, the locking units 64G are actuated by the folding arms 63G to releasably lock up two corner portions of the input module 80G at the corner portions of the supporting arm 61G respectively. Accordingly, each of the locking units 64G have a locking cavity formed at the end of the supporting arm 61G and comprise a locking latch movably extended from the end of the supporting arm 61G and is actuated by the folding arm 63G to engage the locking latch with the locking cavity so as to lock up input module 80G with the screen module through the foldable stand 60G.

Therefore, when the folding arms 63G are outwardly folded from the supporting arm 61G, the folding arms 63G and the supporting arm 61G form a stand to support the screen module. At the same time, the locking units 64G are released for enabling the input module 80G to be detached from the screen module, so as to form a working station. When the folding arms 63G are inwardly folded to align with the supporting arm 61G, the foldable stand 60G is folded up. At the same time, the locking units 64G are actuated to lock up the corner portions of the input module 80G. As a result, the screen module can be pivotally and downwardly folded to overlap on the input module 80G via the foldable joint 62G, so as to enhance the portability of the working station.

It is worth mentioning that the working station of the present invention is able to operatively link with an existing tablet computer to serve as one of the first and second screens 10G, 20G. Accordingly, two existing tablet computers are adapted to be mounted at the mounting mechanism 30G, wherein the communication module 50G can communicatively link to the table computers. In other words, the tablet computers can be controlled by the input module 80G.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multiple screen arrangement for a mobile device, comprising:
   a screen module comprising first and second screens movably coupled with each other between a first state and a second state by a mounting mechanism, wherein at said first state, said second screen is overlapped behind said first screen in a single screen size manner, and at said second state, said first and second screens are move side-by-side to provide at least two viewing windows, wherein said mounting mechanism comprises a first slidable rail, a second slidable rail, a plurality of first gearing teeth provided along said first slidable rail, a plurality of second gearing teeth provided along said second slidable rail, and at least a driven gear operatively engaged between said first gearing teeth and said second gearing teeth to synchronize sliding movement of said first screen and said second screen; and
   a resilient arm coupled at a rear side of said second screen to frontwardly push said second screen to align with said first screen edge-to-edge, wherein said first slidable rail and said second slidable rail are slidably engaging with bottom portions of said first and second screens respectively, wherein said mounting mechanism further comprises a sliding bracket having a front wall and a rear wall to define a sliding channel that said first and second slidable rails are supported therein, wherein a L-shaped guiding slot is formed at a bottom wall of said sliding bracket and a sliding guider is downwardly protruded from said second slidable rail to slidably engage with said guiding slot, so as to guide said second screen to slide from said first state to said second state and to guide said second screen to be located edge-to-edge with respect to said first screen.

2. The multiple screen arrangement, as recited in claim 1, wherein said first and second slidable rails are parallel with each other at a position that said first and second gearing teeth are facing each other.

3. The multiple screen arrangement, as recited in claim 1, wherein when said first and second screens are slid toward each other, said first and second screens are at said first state, and when said first and second screens are slid away from each other, said first and second screens are at said second state.

4. The multiple screen arrangement, as recited in claim 1, wherein said mounting mechanism further comprises a first guiding stopper provided at one end of said first slidable rail to ensure said first screen to be only slid at one direction, and a second guiding stopper provided at one of said front and rear walls of said sliding bracket to ensure said second screen to be only slid at an opposed direction.

5. The multiple screen arrangement, as recited in claim 1, further comprising:
   a processor unit operatively linked to said screen module for processing data to be displayed on at least one of said first and second screens; and
   a communication module for communicatively linking said screen module with a mobile device via a wire connection or wireless connection.

6. The multiple screen arrangement, as recited in claim 5, wherein said wire connection or wireless connection are selected from a group consisting of pairing via Bluetooth, NFC, Wi-Fi, 3G, 4G, and 5G.

7. The multiple screen arrangement, as recited in claim 5, further comprising a foldable stand for supporting said screen module in an upright manner, wherein said foldable stand comprises a supporting arm movably coupled with said mounting mechanism via a foldable joint, and two folding arms pivotally extended from two ends of said supporting arm for selectively outwardly folding to form a stand to support said screen module in an upright manner, and inwardly folding align with said supporting arm to fold up said foldable stand.

8. The multiple screen arrangement, as recited in claim 7, wherein said first and second slidable rails are parallel with each other at a position that said first and second gearing teeth are facing each other.

9. The multiple screen arrangement, as recited in claim 8, wherein when said first and second screens are slid toward each other, said first and second screens are at said first state, and when said first and second screens are slid away from each other, said first and second screens are at said second state.

10. A computerized working station for a mobile device, comprising:

a screen module comprising first and second screens movably coupled with each other between a first state and a second state by a mounting mechanism, wherein at said first state said, second screen is overlapped behind said first screen in a single screen size manner, and at said second state, said first and second screens are moved side-by-side to provide two viewing windows, wherein said mounting mechanism comprises a first slidable rail, a second slidable rail, a plurality of first gearing teeth provided along said first slidable rail, a plurality of second gearing teeth provided along said second slidable rail, and a driven gears operatively engaged between said first gearing teeth and said second gearing teeth to synchronize sliding movement of said first and second screen, wherein said first slidable rail and said second slidable rail are slidably engaging with bottom portions of said first and second screens respectively, wherein said mounting mechanism further comprises a sliding bracket having a front wall and a rear wall to define a sliding channel that said first and second slidable rails are supported therein, wherein a L-shaped guiding slot is formed at a bottom wall of said sliding bracket and a sliding guider is downwardly protruded from said second slidable rail to slidably engage with said guiding slot, so as to guide said second screen to slide from said first state to said second state and to guide said second screen to be located edge-to-edge with respect to said first screen;

a processor unit operatively linked to said screen module for processing data to be displayed on at least one of said first and second screens; and a communication module for communicatively linking said screen module with a mobile device via a wire connection or wireless connection.

11. The computerized working station, as recited in claim 10, wherein said wire connection or wireless connection are selected from a group consisting of pairing via Bluetooth, NFC, Wi-Fi, 3G, 4G, and 5G.

12. The computerized working station, as recited in claim 10, further comprising a foldable stand for supporting said screen module in an upright manner, wherein said foldable stand comprises a supporting arm movably coupled with said mounting mechanism via a foldable joint, and two folding arms pivotally extended from two ends of said supporting arm for selectively outwardly folding to form a stand to support said screen module in an upright manner, and inwardly folding align with said supporting arm to fold up said foldable stand.

13. The computerized working station, as recited in claim 10, wherein said first and second slidable rails are parallel with each other at a position that said first and second gearing teeth are facing each other.

14. The computerized working station, as recited in claim 10, wherein when said first and second screens are slid toward each other, said first and second screens are at said first state, and when said first and second screens are slid away from each other, said first and second screens are at said second state.

15. The computerized working station, as recited in claim 10, wherein said mounting mechanism further comprises a first guiding stopper provided at one end of said first slidable rail to ensure said first screen to be only slid at one direction, and a second guiding stopper provided at one of said front and rear walls of said sliding bracket to ensure said second screen to be only slid at an opposed direction.

* * * * *